United States Patent [19]

Thompson et al.

[11] 4,129,455
[45] Dec. 12, 1978

[54] DISPERSIONS

[75] Inventors: Morice W. Thompson, Maidenhead; Arthur Topham, Middleton, both of England

[73] Assignee: Imperial Chemical Industries Limited, London, England

[21] Appl. No.: 684,356

[22] Filed: May 7, 1976

Related U.S. Application Data

[63] Continuation of Ser. No. 495,042, Aug. 5, 1974, abandoned.

[30] Foreign Application Priority Data

Aug. 21, 1973 [GB] United Kingdom ............ 39428/73

[51] Int. Cl.$^2$ .............................................. C04B 31/40
[52] U.S. Cl. ........................... 106/308 N; 106/288 Q; 560/26; 560/158
[58] Field of Search ............. 106/308 N, 288 Q; 260/404.5, 471 C, 482 B, 553 A, 404.5 R, 404.5 I, 404.5; 560/26, 158

[56] References Cited

U.S. PATENT DOCUMENTS

| | | | |
|---|---|---|---|
| 2,780,562 | 2/1957 | Reinartz et al. | 106/308 N |
| 3,560,235 | 2/1971 | Sarfas et al. | 106/308 N |
| 3,723,151 | 3/1973 | Backhouse et al. | 106/308 N |
| 3,728,301 | 4/1973 | Spence et al. | 106/308 N |
| 3,775,327 | 11/1973 | Thompson et al. | 252/62.54 |
| 3,928,276 | 12/1975 | Linden | 106/308 N |
| 4,042,413 | 8/1977 | Hauxwell et al. | 106/308 N |

Primary Examiner—L. Dewayne Rutledge
Assistant Examiner—John P. Sheehan
Attorney, Agent, or Firm—Cushman, Darby & Cushman

[57] ABSTRACT

Compositions of matter comprising a finely divided dispersion of a solid having a particle size of less than 20 microns in an organic liquid selected from the class consisting of hydrocarbons and halogenated hydrocarbons containing dissolved therein an adduct of one or more compounds from each of the following classes (a) an organic compound containing two or more isocyanate groups, (b) an organic compound containing two or more groups which are reactive with isocyanate groups, and (c) an addition polymer containing a hydroxy group, the amount of the adduct corresponding to between .5% and 100% by weight based on the weight of the solid, and the amount of the solid corresponding to between 5% and 70% by weight based on the total weight of the dispersion for use in the preparation of inks and paints.

6 Claims, No Drawings

DISPERSIONS

This is a continuation, of application Ser. No. 495,042 filed Aug. 5, 1974 now abandoned.

This invention relates to dispersing agents which are especially valuable for the production of dispersions of solids, in particular pigments or dyestuffs, in organic liquids.

According to the invention there are provided as dispersing agents the adducts of one or more compounds from each of the following classes:

(a) an organic compound containing two or more isocyanate groups, (b) an organic compound containing two or more groups which are reactive with isocyanate groups, and (c) an addition polymer containing a hydroxy group The addition polymer containing a hydroxy group can be the adduct of an alkylene oxide for example ethylene oxide and/or propylene oxide with an alcohol, an amine, a phenol or a carboxylic acid, preferably of an aliphatic alcohol, amine or carboxylic acid containing a chain of at least twelve carbon atoms. Alternatively the said addition polymer is a polymer derived from an ethylenically unsaturated monomer, for example styrene, obtained by polymerising the ethylenically unsaturated monomer in the presence of a chain transfer agent containing a hydroxyl group such as β-mercaptoethanol.

The organic compound b) which contains two or more groups which are reactive with isocyanate groups is preferably an organic compound which contains two or more hydroxy and/or primary or secondary amino groups which are reactive with isocyanate groups.

According to a further feature of the invention there is provided a process for the manufacture of the said dispersing agents which comprises reacting together (a) an organic compound containing two or more isocyanate groups, (b) an organic compound containing two or more groups which are reactive with isocyanate groups, and c) an addition polymer containing a hydroxy group.

In carrying out this reaction instead of using a single compound from each of the three classes a), b) and c), mixtures of two or more compounds from one or more of these classes can in fact be used.

The reaction products of a), b), and c) contain urethane, urea, allophanate and/or biuret groups these being formed by reaction of the isocyanate groups present in a) with the hydroxy and/or amino groups present in b) and c). The compound containing the isocyanate groups a) can be reacted simultaneously with the compounds b) and c), or the compound a) can be reacted with b), compound c) added and the reaction completed. It is however preferred to react compound a) with compound c) and then to react with compound b) using an amount of compound b) which is at least equivalent to the free isocyanate groups present in the initial adduct of a) and c). If the final adduct of a), b) and c) still contains free isocyanate groups then these are preferably destroyed by reaction with a monoalcohol such as methanol or a mono- amine such as ethylamine.

In carrying out the reaction it is preferred to use from 1 to 10, and especially from 1½ to 3, molecules of the polyisocyanate for each molecule of compound c); the usage of compound b) then corresponding at least to the free isocyanate groups present in the initial reaction product of a) and c). The reaction is preferably carried out in the presence of a catalyst for isocyanate reactions, such as diazabicyclooctane.

The reaction can be conveniently carried out in the presence of an inert organic solvent, such as acetone or a hydrocarbon liquid such as a petroleum fraction, the reaction preferably being carried out at a temperature between 40° C. and the boiling point of the reaction medium. At the conclusion of the reaction the inert organic solvent can be removed in conventional manner, for example by distillation, but if desired the resulting solution of the adduct in the inert organic solvent can be used directly in the preparation of dispersions.

The compounds a) may be any aliphatic or cycloaliphatic compounds containing two or more isocyanate groups such as hexamethylene diisocyanate and isophorene diisocyanate, but are preferably aromatic polyisocyanates such as 4:4'-diisocyanatodiphenylmethane, 2:4-diisocyanatotoluene and 2:6-diisocyanatotoluene, and especially commercially available mixtures of 2:4- and 2:6-diisocyanatotoluene.

The compounds b) which contain two or more groups which react with isocyanate groups are preferably organic compounds which contain at least two hydroxy and/or primary or secondary amino groups. Such compounds include trimethylolpropane, diethanolamine and triethanolamine, but the preferred compounds are those containing two such groups. Such compounds include aliphatic diols for example ethylene glycol, propylene glycol, butane 1:3- or 1:4-diol, 1:5-pentanediol, 1:6-hexanediol and 1:10-decanediol. Other compounds of this preferred class include aliphatic diamines such as ethylenediamine; 1.3-propylenediamine, hexamethylenediamine and commercially available amines of the formula $VNH(CH_2)_3NH_2$ where V is a long chain fatty radical, such as that derived from tallow. Other compounds include aminoalcohols such as ethanolamine and β-hexadecylaminoethanol, diols containing ether groups such as diethyleneglycol, triethyleneglycol, polyethyleneglycol and dipropyleneglycol, and adducts of ethylene oxide with aliphatic primary amines, for example an adduct of two molecular proportions of ethylene oxide with one molecular proportion of a fatty amine derived from coconut oil which is commercially available as Ethomeen C/12. Preferred compounds b) are aliphatic diols containing at least 5 carbon atoms and especially polymethylene glycols containing from 5 to 10 carbon atoms.

The dispersing agents of the invention are of value for preparing dispersions of solids, especially pigments, or dyestuffs in organic liquids.

According to a further feature of the invention there are provided finely divided dispersions of solids, especially pigments or dyestuffs, in organic liquids which contain dissolved therein a dispersing agent comprising an adduct of a), b) and c).

The said dispersions can be obtained by any of the conventional and well known methods of preparing dispersions. Thus the solid, the organic liquid and the dispersing agent may be mixed in any order and the mixture then subjected to a mechanical treatment to reduce the particle size of the solid, for example by ball milling, or gravel milling until the dispersion is formed. The mechanical treatment is preferably continued until the particle size of the solid is below 20 microns although it is advantageous to reduce the particle size still further to below 10 microns.

If desired the dispersion can contain other substances, such as zinc rosinate or natural or synthetic resins, which are conventionally present in dispersions of pigments or dyestuffs in organic liquids.

Alternatively, the solid can be treated to reduce its particle size independently or in admixture with either the organic liquid or dispersing agent, and the other ingredient or ingredients then added following which dispersion can be obtaind by stirring the mixture. As a further alternative an organic liquid solution of the dispersing agent can be emulsified into an aqueous phase by known means, such as high speed stirring, in the presence of one or more active agents, and the resulting emulsion added to an aqueous slurry of the solid, after which the organic liquid and the water are removed by filtration and drying of the residue of pigment or dyestuff and dispersing agent. This residue can be subsequently dispersed in an organic medium. Compositions obtained in this way and comprising the solid in finely divided form and the dispersing agent are a further feature of the invention.

It is preferred that the amount of dispersing agent in the dispersions is such as corresponds to between 5 and 100% by weight, and preferably between 10 and 30%, based on the weight of the solid, and the dispersions preferably contain from 5 to 70% by weight of the solid based on the total weight of the dispersion.

The organic liquids used to prepare the said dispersions can be any inert organic liquids in which the said dispersing agents are at least partly soluble at ambient temperatures and which are stable under the subsequent conditions of usage of the dispersion. If desired mixtures of organic liquids can be used. Preferred organic liquids are hydrocarbons and halogenated hydrocarbons such as benzene, toluene, xylene, white spirit, n-hexane, cyclohexane, chlorobenzene, carbon tetrachloride, and perchloroethylene. Other organic liquids can however be used, for example esters such as dialkyl phthalates, alkyd resins and heat bodied linseed oils used as lithographic varnish media. Above all it is preferred that the organic liquid is a predominantly aliphatic petroleum fraction. In general, the organic liquids or mixtures thereof used to prepare the dispersions will depend on the subsequent uses to which the dispersions are to be put.

The pigments can be either inorganic or organic pigments, and can be of any of the recognised classes of pigments. As examples of inorganic pigments there may be mentioned zinc oxide, Prussian Blue, cadmium sulphide, iron oxides, vermillion, ultramarine and chrome pigments including chromates of lead, zinc, barium and calcium and the various mixtures and modifications thereof such as are commercially available as greenish-yellow to red pigments under the name primrose, lemon, middle, orange, scarlet and red chromes.

As examples of organic pigments there may be mentioned pigments of the azo, thioindigo, anthraquinone, anthanthrone, isodibenzanthrone or triphendioxazine series, vat dye pigments, phthalocyanine pigments such as copper phthalocyanine and its nuclear halogenated derivatives and copper tetraphenyl and octaphenyl phthalocyanines, quinacridone pigments and lakes of acid, basic and mordant dyestuffs. Such pigments are described in, for example, the 3rd Edition of the Colour Index which was published in 1971 under the heading "Pigments" and in subsequent authorised amendments thereto. Preferred pigments are copper phthalocyanine and its nuclear halogenated derivatives. When the pigment is β-form copper phthalocyanine it may be the normal pigmentary form of the copper phthalocyanine or it may be crude copper phthalocyanine.

The dispersing agents of the invention are particularly valuable for the preparation of pigmentary dispersions of copper phthalocyanine directly from crude copper phthalocyanine.

The dyestuffs can be any of the recognised classes of dyestuffs such as are described in for example the 3rd Edition of the Colour Index. A preferred class of dyestuffs comprises Disperse Dyestuffs, the resulting dispersions being of value for the production of printed paper which is to be used in the process of transfer colour printing.

The dispersions of the invention are fluid or semifluid compositions containing the pigment or dyestuff in finely divided and deflocculated form, and can be used for any purpose for which dispersions of these particular solids are conventionally used. Thus the dispersions are of particular value in the manufacture of printing inks, by incorporating the dispersions with the other components conventionally used in the manufacture of such inks. The pigment dispersions are especially of value in the manufacture of paints, for which purpose the dispersions are incorporated into conventional alkyd or other resins, as there is improved resistance to flocculation in the presence of titanium dioxide.

The invention is illustrated but not limited by the following Examples in which the parts and percentages are by weight:-

In the Examples all references to tolylene diisocyanate denote the commercially available mixture containing 80% of the 2:4- isomer and 20% of the 2:6- isomer. Unless otherwise stated the petroleum fraction is one boiling at 100° to 120° C.

ADDITION POLYMER A

700 Parts of a commercially available fatty alcohol containing 5.95% of hydroxy groups (and this corresponding to an average molecular weight of 285) are reacted with 700 parts of propylene oxide at 140° to 150° C. in presence of 2.8 parts of potassium hydroxide and 1.4 parts of sodium hydroxide. The resulting product is a pale mobile liquid having a hydroxyl value of 113 mgms of KOH/gm.

ADDITION POLYMER B

400 Parts of toluene are stirred at the boil under a reflux condensor under an atmosphere of nitrogen and a feed of 270 parts of styrene, 10.8 parts of β-mercaptoethanol and 5.4 parts of azobisisobutyronitrile is metered in over a period of 3 hours, the mixture being maintained at the boil. The mixture is then stirred for 4 hours at the boil, 2 parts of azobisisobutyronitrile are added, and the mixture stirred for a further 6 hours at the boil. The mixture is then cooled, poured into 2000 parts of methanol, and the precipitated polymer is filtered off and washed with methanol. The polymer is dissolved in toluene, and the residual methanol removed by distillation at reduced pressure. The resulting toluene solution contains 54.9% of the polymer which has an average molecular weight of 1200 based on the hydroxyl value.

ADDITION POLYMER C

This consists of an adduct of 2.5 molecular proportions of ethylene oxide with 1 molecular proportion of a mixture of oleyl and cetyl alcohols.

ADDITION POLYMER D

This consists of an adduct of 2.3 molecular proportions of butylene oxide (66% of the 1:2-isomer and 34% of the 2:3-isomer) with 1 molecular proportion of a commercially available fatty alcohol having an average molecular weight of 286.

EXAMPLE 1

A mixture of 30.4 parts of tolylene diisocyanate and 0.4 part of benzoyl chloride is stirred at 25° C. whilst 43.3 parts of Addition Polymer A are added. The temperature is raised to 110° C. and maintained for 1 hour. The mixture is cooled to 50° C., 36.0 parts of acetone, 15.4 parts of 1:6-hexanediol and 0.5 part of diazabicyclooctane are added and the mixture stirred for 1 hour at the boil under a reflux condenser. 0.8 Part of methanol is added and the mixture stirred at the boil under reflux for a further 2 hours. 22 Parts of a petroleum fraction are added, and the mixture is then distilled to remove the acetone whilst keeping the volume constant by addition of further amounts of the petroleum fraction until the temperature of the vapour reaches 101° C. The residue is then diluted with the petroleum fraction giving a 46.9% solution of the product.

EXAMPLE 2

In place of the 43.3 parts of Addition Polymer A used in Example 1 there are used 31.8 parts of Addition Polymer C. The final solution of the resulting adduct is diluted with 43.3 parts of toluene and sufficient of the petroleum fraction to give a total weight of solution of 233.2 parts containing 33.6% of the adduct.

EXAMPLE 3

In place of the 43.3 parts of Addition Polymer A used in Example 1 there are used 39.3 parts of Addition Polymer D. The final solution of the adduct is diluted with the petroleum fraction to give 191.7 parts of solution containing 44.9% of the adduct.

EXAMPLE 4

In place of the 15.4 parts of hexanediol used in Example 1 there are used 17.5 parts of dipropylene glycol. 185 Parts of a 49.8% solution of the adduct are obtained.

The infra red spectrum shows bands at 3340, 1710, 1530 and 1240 cm$^{-1}$ due to urethane groups.

EXAMPLE 5

In place of the 15.4 parts of hexanediol used in Example 1 there are used 26.1 parts of polyethyleneglycol having an average molecular weight of 200. 174.9 Parts of a 57.6% solution of the adduct are obtained.

EXAMPLE 6

In place of the 15.4 parts of hexanediol used in Example 1 there are used 8.1 parts of ethylene glycol. 163.0 Parts of a 50.7% solution of the adduct are obtained.

EXAMPLE 7

In place of the 15.4 parts of hexanediol used in Example 1 there are used 37.2 parts of Ethomeen C/12 which is an adduct of 2 molecular proportions of ethylene oxide with 1 molecular proportion of cocoamine. 180.5 Parts of a 62.0% solution of the adduct are obtained.

EXAMPLE 8

A mixture of 12.15 parts of tolylene diisocyanate, 0.024 part of benzoyl chloride and 0.29 part of the petroleum fraction is stirred at 20°-30° C., whilst 76 parts of the 54.9% solution of Addition Polymer B are added. The mixture is then stirred for 1 hour at 110° C. The mixture is cooled to 50° C., 44 parts of acetone, 6.2 parts of hexanediol and 0.1 part of diazabicyclooctane added, and the mixture stirred at the boil under a reflux condenser for 1 hour. 0.8 Part of methanol is added and the mixture boiled for a further 2 hours. 17 Parts of toluene are then added, and the acetone removed by distillation to a vapour temperature of 109° C., toluene being added to maintain the volume of the mixture. The mixture is then diluted with toluene to give 146.7 parts of a 41.0% solution of the adduct.

EXAMPLE 9

A mixture of 0.4 part of benzoyl chloride and 30.4 parts of tolylene diisocyanate is stirred at 20°-30° C. whilst 43.3 parts of Addition Polymer A are added. The mixture is then stirred for 1 hour at 110° C., cooled to 50° C. and a warm solution of 48.3 parts of a fatty diamine of the formula VNH(CH$_2$)$_3$NH$_2$ where V is the fatty radical derived from tallow (which diamine is commercially available under the name of Duomeen T) in 195 parts of the petroleum fraction is added. The mixture is stirred at the boil for 3 hours, 0.8 part of methanol being added after 1 hour. The resulting solution contains 57.5% of the adduct.

The infra red spectrum shows the absence of isocyanate groups in the adduct, whilst bands at 1630 and 1540 cm$^{-1}$ shows the presence of urea groups.

EXAMPLE 10

A mixture of 3 parts of β-form copper phthalocyanine, 3.2 parts of the 46.9% solution of the adduct of Example 1 and 3.8 parts of the petroleum fraction is ball milled for 16 hours to give a finely divided and well deflocculated dispersion of the pigment which is suitable for use in a gravure printing ink.

The following Table gives further Examples of dispersions of the invention which are obtained by milling together 3 parts of the pigment or dyestuff listed in Column 2 of the Table, the adduct and the actual amount thereof (weight % based on the weight of the pigment) listed in Column 3 of the Table and sufficient of the organic liquids listed in Column 4 of the Table to bring the total weight of the three components together with the amount of solvent in the solution of the agent to 10 parts (unless otherwise stated).

| EXAMPLE | PIGMENT OR DYESTUFF | ADDUCT AND AMOUNT THEREOF | ORGANIC LIQUID |
| --- | --- | --- | --- |
| 11 | β-form copper phthalocyanine | 25% of the adduct of Example 1 | Petroleum Fraction |
| 12 | " | 50% of the adduct of Example 2 | Toluene (to total of 20 parts) |
| 13 | " | 50% of the adduct of Example 3 | Petroleum Fraction |
| 14 | " | 25% of the adduct of | " |

-continued

| EXAMPLE | PIGMENT OR DYESTUFF | ADDUCT AND AMOUNT THEREOF | ORGANIC LIQUID |
|---|---|---|---|
| 15 | " | 50% of the adduct of Example 3 | " |
| 16 | " | 50% of the adduct of Example 5 | " |
| 17 | " | 50% of the adduct of Example 6 | " |
| 18 | " | 50% of the adduct of Example 7 | " |
| 19 | " | 100% of the adduct of Example 8 | Toluene (to total of 33 parts) |
| 20 | Rosinated calcium toner of 2-(2'-sulpho-4'-methylphenylazo)-2-naphthol-3-carboxylic acid | 25% of the adduct of Example 1 | Petroleum Fraction |
| 21 | Lead sulphochromate | 25% of the adduct of Example 1 | " |
| 22 | the phosphomolybdo-tungstate of CI Basic Blue 4 (42595) | 25% of the adduct of Example 1 | " |
| 23 | copper polychloro-phthalocyanine | 25% of the adduct of Example 1 | " |
| 24 | 4:10-dibromo-anthanthrone | 25% of the adduct of Example 1 | " |
| 25 | indanthrone | 25% of the adduct of Example 1 | " |
| 26 | 4-nitro-N-ethyl-N-β-cyanoethyl)-4'-aminoazobenzene | 50% of the adduct of Example 1 | " |
| 27 | 1-ethyl-3-(3'-oxoiso-indolin-1'-ylidene) oxindole | 50% of the adduct of Example 1 | " |
| 28 | β-form copper phthalocyanine | 50% of the adduct of Example 1 | Hexane |
| 29 | " | 50% of the adduct of Example 1 | Cyclohexane |
| 30 | " | 50% of the adduct of Example 1 | Xylene |
| 31 | " | 50% of the adduct of Example 1 | A dialkyl phthalate derived from a synthetic $C_7$–$C_9$ aliphatic alcohol |
| 32 | " | 50% of the adduct of Example 1 | perchloro-ethylene |
| 33 | " | 50% of the adduct of Example 9 | petroleum fraction |

What is claimed:

1. Composition of matter comprising a finely divided dispersion of a solid having a particle size of less than 20 microns in an organic liquid selected from the class consisting of hydrocarbons and halogenated hydrocarbons containing dissolved therein a reaction product obtained by chemical reaction of one or more compounds from each of the following classes:
   (a) an aliphatic, cycloaliphatic or aromatic hydrocarbon substituted by at least two isocyanate groups;
   (b) an aliphatic diol containing from 5 to 10 methylene groups, and
   (c) an addition polymer containing an hydroxy group consisting of the reaction product of an alkylene oxide with a phenol, an aliphatic alcohol or an aliphatic amine wherein such alcohol or amine contains a chain of at least 12 carbon atoms.

2. Composition of matter as claimed in claim 1 wherein the solid is a dyestuff.

3. Composition of matter as claimed in claim 2 wherein the dyestuff is a disperse dyestuff.

4. Composition of matter as claimed in claim 1 wherein the solid is an inorganic pigment.

5. Composition of matter as claimed in claim 1 wherein the solid is an organic pigment.

6. Composition of matter as claimed in claim 5 wherein the organic pigment is a phthalocyanine pigment.

* * * * *